United States Patent

Matthews

[11] 3,906,717
[45] Sept. 23, 1975

[54] TURBINE ENGINE OIL SUMP EMISSION CONTROL

[75] Inventor: Charles C. Matthews, Warren, Mich.

[73] Assignee: General Motors Corporation, Detroit, Mich.

[22] Filed: Mar. 21, 1974

[21] Appl. No.: 453,288

[52] U.S. Cl. .............................. 60/39.08; 184/6.11
[51] Int. Cl.² ........................ F02C 7/06; F01M 9/10
[58] Field of Search ...................... 60/39.08, 39.5 L; 184/6.11; 123/119 B; 415/11 L

[56] References Cited
UNITED STATES PATENTS

| | | | |
|---|---|---|---|
| 2,493,617 | 1/1950 | Chubbuck | 123/119 B |
| 2,613,498 | 10/1952 | Prendergast | 60/39.08 |
| 3,713,588 | 1/1973 | Sharpe | 60/39.74 B X |

Primary Examiner—C. J. Husar
Assistant Examiner—Thomas I. Ross
Attorney, Agent, or Firm—J. C. Evans

[57] ABSTRACT

A gas turbine engine emissions control system includes an auxiliary air compressor having a control circuit on the discharge side thereof to direct a controlled amount of primary air through the air fuel nozzle of a gas turbine engine burner assembly. The lubricant sump of the gas turbine engine is connected to the inlet of the auxiliary air compressor through a canister that includes orifice means therein to supply make-up air required to prevent evacuation of the lubricant sump by the auxiliary air compressor as it withdraws hydrocarbon vapors therefrom for discharge into the burner assembly where they are consumed in the normal combustion process.

2 Claims, 1 Drawing Figure

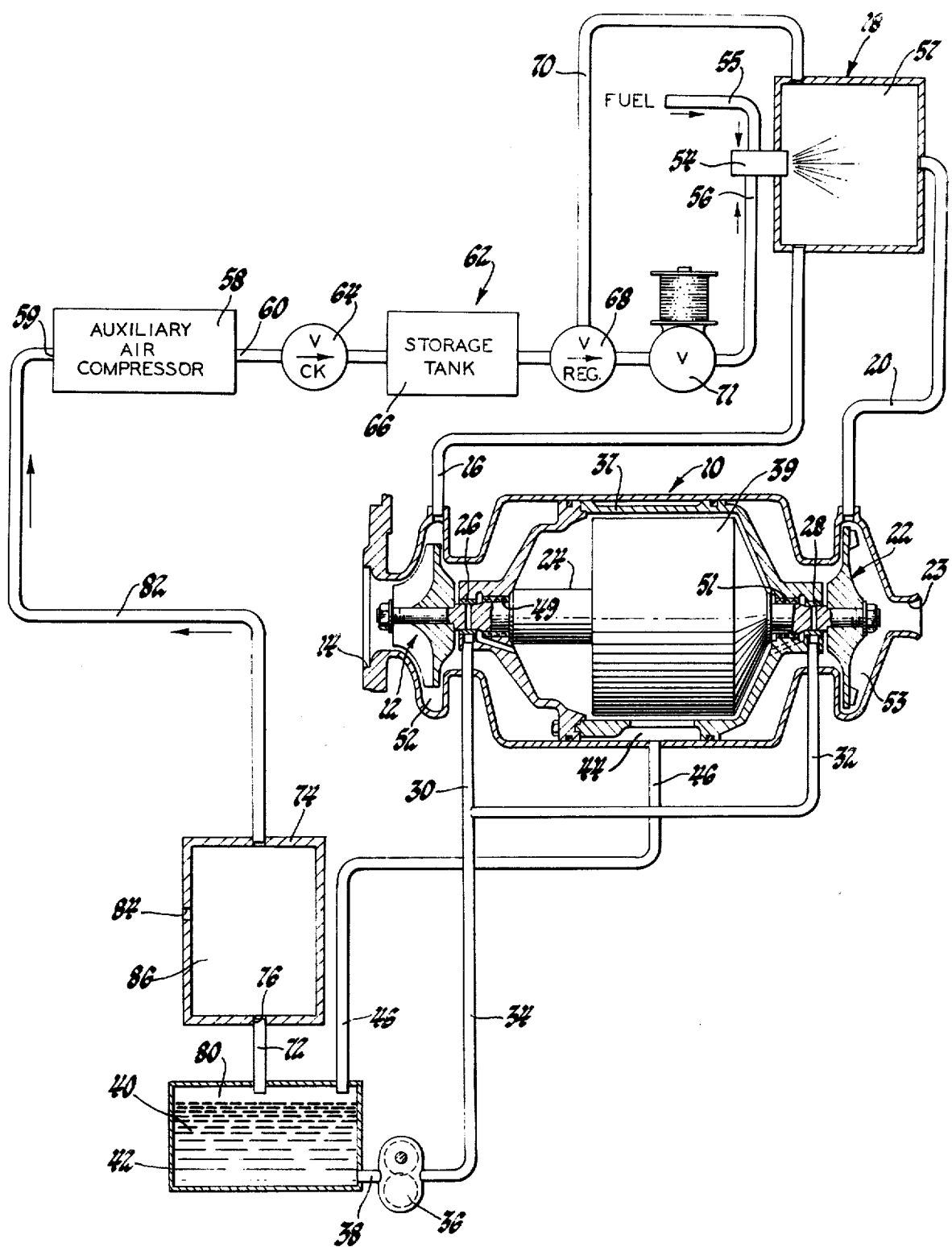

TURBINE ENGINE OIL SUMP EMISSION CONTROL

This invention relates to gas turbine engines and more particularly to emission control systems for a vented lubricant sump in a gas turbine engine.

In gas turbine engines, small gas leakage paths normally exist between high pressure air cavities in the system and lubrication galleries therein which are eventually communicated with a lubricating oil sump of the engine. Such sumps are normally vented to atmosphere to avoid buildup of pressure that might adversely effect distribution of lubricant to the bearing components of the engine.

The contact of high pressure air with lubricant oil that is heated during the oil distribution process can result in a vented gas from the lubricant sump that has a significant concentration of unburned hydrocarbons.

Accordingly, an object of the present invention is to improve such systems by the provision therein of means for scavenging the unburned hydrocarbons in the vent conduit and consuming them by combustion while avoiding buildup of pressure in the lubricant distribution system.

Another object of the present invention is to improve gas turbine engines having a lubricant sump normally vented to atmosphere by the provision of means for withdrawing gas vented from the sump and directing it through a fuel nozzle for a gas turbine engine burner to cause the hydrocarbon vapors from the sump to be consumed during the normal combustion process in the burner and by the further provision of means that produce such withdrawal and consumption of the hydrocarbon vapors while avoiding a buildup of pressure within the lubricant distribution system of the gas turbine engine.

Yet another object of the present invention is to improve emissions control in a gas turbine engine of the type including a vented lubricant sump that receives high pressure air and lubricant from the turbine engine during its operation by connecting the inlet of an auxiliary air compressor for supplying primary air to the nozzle of a burner assembly in the turbine engine to the vent conduit from the lubricant sump through means that will prevent evacuation of the lubricant sump and that will avoid pressure buildup in the lubricant distribution system and wherein the auxiliary air supply compressor is operative to withdraw concentrations of unburned hydrocarbons from the lubricant sump and direct them into the burner where they are consumed during the normal combustion process.

Further objects and advantages of the present invention will be apparent from the following description, reference being had to the accompanying drawings wherein a preferred embodiment of the present invention is clearly shown.

The single FIGURE of the drawings shows a diagrammatic representation of a gas turbine engine and lubricant system including the present invention.

The engine 10, which is representative of a turbine engine with oil sump emissions, includes a compressor 12 having an inlet 14 in communication with atmosphere and an outlet 16 for directing compressed air to a combustor or burner assembly 18. Combustion products from the burner assembly 18 are directed through a conduit 20 and across a turbine 22 to exhaust 23. Turbine 22 is connected to compressor 12 by a shaft 24. The shaft 24 has shaft bearings 26, 28 at either end thereof each connected to a lubricant supply conduit 30, 32 respectively, in turn in communication with the discharge line 34 from an oil pump 36 having the inlet 38 thereof in communication with lubricant 40 in a lubricating oil sump 42 of the engine 10. Enlarged frame 37 surrounds an alternator 39 with its rotor assembly connected to shaft 24.

The engine 10 further includes an oil return gallery 44 that is inboard of each of the bearing means 26, 28 and in communication with a lubricant return line 46 that is connected interiorly of the lubricating oil sump 42. The shaft 24 further includes shaft seals 49, 51 representatively shown as inboard of bearings 26, 28 that seal against leakage of high pressure air from the discharge cavity 52 of the compressor 12 and from the high pressure cavity 53 of the turbine 22. The seals 49, 51 are representative of small gas leakage paths that are normally present in gas turbine engines between high pressure cavities therein and lubrication galleries. Normally, lubrication sumps are vented to atmosphere to avoid buildup of pressure on the low pressure return side of the oil distribution system that would impede circulation of oil therethrough. However, in turbine engine oil distribution systems when high pressure air bleeds through the seals to contact oil that is heated during the lubricating process a combination of heated lubricant and gas bubbles are returned through the lubricant return line 46. A gas concentration above the lubricating oil sump 42 accordingly carries a significant concentration of unburned hydrocarbons that in the past have been vented directly to atmosphere to avoid any buildup of pressure in the lubricant system.

The present invention is directed to an improved system for collecting the hydrocarbon emissions from the sump while retaining the advantage of avoidance of buildup of pressure within the system. To obtain these objectives, the system makes use of the combustion process in the turbine engine 10. The burner assembly 18 receives an input of liquid fuel and high pressure air through a fuel nozzle 54 having a fuel inlet 55 thereon as well as a primary air fitting 56 in communication therewith. The high pressure air directed through the fitting 56 is used to promote atomization of fuel into small droplets for more efficient combustion within the interior 57 of the burner assembly 18. High pressure air in the present invention is supplied by an auxiliary air compressor 58 having an inlet 59 and an outlet 60 connected to a control circuit 62.

The control circuit 62 includes a discharge check valve 64 upstream of a storage tank 66 having a volume that ensures a supply of atomizing air during engine start and sudden engine transient operation. This storage tank in turn is in communication with a differential pressure regulator valve 68 that is operated in accordance with pressure conditions within the interior 57 of the burner assembly 18 as sensed through a conduit 70. The flow of air from the auxiliary air compressor 58 to the inlet fitting 56 of the nozzle 54 is produced only when the engine is running by virtue of the control function of a solenoid valve 71 that is normally closed and only energized to allow air flow when the engine is running.

The auxiliary air compressor 58 preferably is belt-driven reciprocating air compressor that is operated from a power take-off (not shown) off the gas turbine engine 10.

In accordance with the present invention, the inlet 59 of the auxiliary air compressor is connected to a vent conduit 72 from the lubricating sump 42 by an enclosure in the form of a canister 74 that includes a bottom inlet opening 76 thereon and a top outlet opening 78 thereon. The bottom inlet opening 76 is directly connected to the sump vent conduit 72 immediately above a gas space 80 within the sump and the outlet opening 78 is connected to the inlet 59 of the compressor via a conduit 82.

The canister 74 additionally includes a side vent opening 84 therein that serves two purposes. First of all, it maintains an atmospheric communication from the vent conduit 72 on the oil lubricating sump 42 during all phases of gas turbine engine operation so as to prevent an undesirable buildup of pressure in the discharge side of the oil distributing system that might adversely effect the circulation of lubricating oil through the bearings of the gas turbine engine 10. Additionally, the vent 84 serves as a make-up air path operative during operation of auxiliary air compressor 58. Thus, during engine operation when the combustor or burner assembly 18 is operative, the auxiliary air compressor will discharge air from the interior 86 of the canister 74 to withdraw hydrocarbon vapors from the sump gas space 80. The typical auxiliary air compressor found in air-fuel distribution systems for the combustor assembly 18 of gas turbine engines will have a capacity that exceeds the rate of vapor supply to an oil lubricating sump. Accordingly, make-up air is drawn through the vent opening 84 into the system to prevent evacuation of the sump space 80 during engine operation. However, in cases where the auxiliary air compressor is rendered inoperative, oil distribution will be maintained in the lubrication system since the vent conduit 72 from the sump will be in communication with atmosphere through the vent opening 84. If desired, the canister 74 can be packed with a loose porous material to cause a portion of oil vapors to separate and drain back to the sump through the vertically oriented vent conduit 72. The remaining hydrocarbon vapors, however, are pumped through the aforedescribed air atomizing system into the nozzle 54 to be consumed in the normal combustion process of the burner assembly 18.

The aforedescribed emission control system retains a basic simplicity and uses many existing components for oil separation and hydrocarbon vapor consumption. It does so, however, by means that will both prevent evacuation of the sump system or an over-pressurization of the low pressure side of the lubrication system of a gas turbine engine. The withdrawal of gas turbine vapors for consumption in the burner assembly can be accomplished without additional wear or harmful effects on either the gas turbine engine or the auxiliary components thereof.

While the embodiments of the present invention, as herein disclosed, constitute a preferred form, it is to be understood that other forms might be adopted.

What is claimed is:

1. In a gas turbine engine having a compressor, burner, turbine and power shaft coupling said compressor and turbine and wherein an oil distribution system supplies lubricant to bearing means in communication with a lubricant gallery and a return path back to a lubricant sump of the engine and seal means are disposed between high pressure cavities in the turbine engine and the lubricant gallery, the improvement comprising: a vent conduit from the lubricant sump of the turbine engine, a burner nozzle having a primary air inlet and a fuel inlet, an auxiliary air compressor for supplying primary air to said air inlet, said auxiliary air compressor having an inlet and an outlet, a canister having a bottom inlet therein in communication with said vent conduit of the sump and having an outlet therefrom connected to said auxiliary air compressor inlet, an atmospheric bleed in said canister to provide make-up flow of air from atmosphere along with the withdrawal of vapors through said vent pipe to prevent evacuation of said sump during turbine engine operation, control means communicating the outlet of the auxiliary air compressor with said air inlet fitting on said burner nozzle operative to allow air flow from the auxiliary air compressor to the burner only when the engine is running, said auxiliary air compressor being operative to draw hydrocarbon vapors from the sump for discharge through the burner nozzle on said burner to cause hydrocarbon vapors within said sump to be consumed within the burner during normal turbine engine combustion operation.

2. A turbine engine emission control system comprising a rotatable machine having an air compressor and a turbine, shaft means for coupling said compressor and turbine together, bearing means for rotatably supporting said shaft means, means for lubricating said bearing means including a lubricant gallery, seal means interposed between high pressure gas cavities in said gas turbine engine and said lubricant gallery, means including a lubricant sump for collecting lubricant from said gallery and for receiving high pressure air bypassed between said gallery and said high pressure cavities during engine operation, a vent conduit from said lubricant sump, means including an auxiliary compressor for withdrawing hydrocarbon vapors from said lubricant sump through said vent conduit thereon, burner means for receiving and consuming hydrocarbon vapors withdrawn from said sump during turbine engine operation, a burner nozzle, make-up air means including an enclosure fluidly communicating said auxiliary air compressor and the vent conduit from said lubricant sump, said enclosure including a vent opening therein sized to supply make-up air from atmosphere to the auxiliary compressor and to direct hydrocarbon vapors from the lubricant sump for discharge through said burner nozzle to be consumed within said burner during normal engine operation.

* * * * *